(12) United States Patent
Montemont

(10) Patent No.: US 12,153,169 B2
(45) Date of Patent: Nov. 26, 2024

(54) METHOD FOR ESTIMATING A DOSE RATE ON THE BASIS OF A SPECTRAL IMAGE

(71) Applicant: Commissariat à l'Energie Atomique et aux Energies Alternatives, Paris (FR)

(72) Inventor: Guillaume Montemont, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 579 days.

(21) Appl. No.: 17/105,762

(22) Filed: Nov. 27, 2020

(65) Prior Publication Data

US 2021/0165112 A1    Jun. 3, 2021

(30) Foreign Application Priority Data

Nov. 29, 2019   (FR) .................................. 19 13570

(51) Int. Cl.
     *G01T 1/02*      (2006.01)
     *G01T 1/169*      (2006.01)

(52) U.S. Cl.
     CPC .............. *G01T 1/026* (2013.01); *G01T 1/169* (2013.01)

(58) Field of Classification Search
     CPC ...................................................... G01T 1/026
     USPC .................................................... 250/370.07
     See application file for complete search history.

(56) References Cited

U.S. PATENT DOCUMENTS

2010/0232568 A1*   9/2010   Heismann ......... H01L 31/02322
                                                                   378/19
2012/0175509 A1*   7/2012   Blevis .................. G01T 1/1648
                                                                   250/361 R

FOREIGN PATENT DOCUMENTS

EP          3 467 548 A1      4/2019
WO     WO 2013/186239 A2    12/2013

OTHER PUBLICATIONS

Chen et al., "A New Compact Gamma Camera with Super Resolution Capability and High Sensitivity for Monitoring Sparse Radioactive Sources in Large Area", IEEE, 2013, 4 pages.
Redus et al., "An Imaging Nuclear Survey System", IEEE Transactions on Nuclear Science, vol. 43, No. 3, Jun. 1996, pp. 1827-1831.

(Continued)

*Primary Examiner* — David P Porta
*Assistant Examiner* — Carolyn Fin
(74) *Attorney, Agent, or Firm* — Oblon, McClelland, Maier & Neustadt, L.L.P.

(57) ABSTRACT

A method for estimating a dose rate, based on measurements taken by a gamma camera, the gamma camera defining an observation field. The estimated dose rate originates from irradiating sources located in the observation field, the irradiating sources emitting ionizing electromagnetic radiation, and the observation field is discretized into a mesh. The gamma camera comprises pixels, each pixel being configured to detect the ionizing electromagnetic radiation, during an acquisition time, and form an energy spectrum therefrom such that together the pixels allow a position of the irradiating sources in the observation field to be obtained in one energy band or in a plurality of energy bands. The method comprising estimating a dose rate generated, at the gamma camera, by points of the mesh.

12 Claims, 7 Drawing Sheets

(56) References Cited

OTHER PUBLICATIONS

Figure 1A:
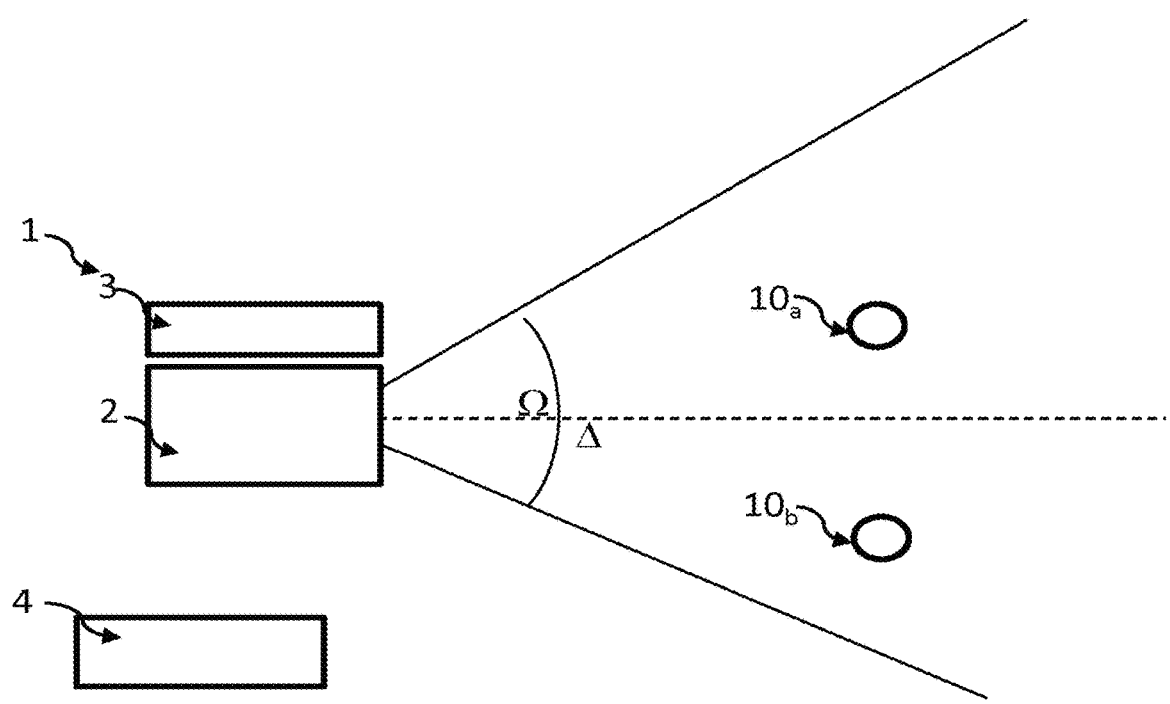

Li et al., "An accurate and ultrafast method for estimating three-dimensional radiological dose rate fields from arbitrary atmospheric radionuclide distributions", Atmospheric Environment 199, 2019, pp. 143-154.
Zhang et al., "Comparisons between a new point kernel-based scheme and the infinite plane source assumption method for radiation calculation of deposited airborne radionuclides from nuclear power plants", Journal of Environmental Radioactivity, 184-185, 2018, pp. 32-45.
Tojo, "A method of Exposure-Dose-Rate Measurement with NaI(TI) Crystal", Nuclear Instruments and Methods 205, 1983, pp. 517-524.

* cited by examiner

METHOD FOR ESTIMATING A DOSE RATE ON THE BASIS OF A SPECTRAL IMAGE

TECHNICAL FIELD

The technical field of the invention is the characterization of irradiating sources present in an environment, notably in a nuclear installation or an installation comprising irradiating sources.

PRIOR ART

Gamma cameras are devices that allow an image to be formed allowing a map of irradiating sources in a given environment, and in particular in nuclear installations, to be formed. This type of device was developed in the 1990s, and is increasingly used in nuclear installations for the purposes of radiological characterization. The objective is to identify the main irradiating sources present in an installation. Specifically, irradiating sources are not uniformly distributed. They are often concentrated locally, forming "hotspots" to use the term conventionally used in the field of radioprotection. Gamma cameras are advantageous in that they allow these hotspots to be located at distance.

The development and use of gamma cameras have been abundantly described in the literature. Since the start of the 2000s, spectrometric gamma cameras have been under development. These cameras are based on a pixelated imager, each pixel allowing a spectrum to be obtained from the irradiation that it detects. Irradiating sources may be located far more easily as a result. Specifically, the spectrometric function allows energy bands of interest, corresponding to unscattered photons, i.e. photons that have not been deviated since their emission by the irradiating source, to be selected. The path of unscattered photons is straight. Their selection, in predetermined energy bands, allows noise corresponding to scattered photons to be removed. Since the latter photons have been deviated since their emission, they provide no useful information as to the location of the irradiating sources. Scattering is therefore a noise source that may be significantly limited by spectrometry.

Another advantage of spectrometric gamma cameras is that knowledge of the energy of the photons allows the isotopes responsible for the irradiation to be identified. This is information that is important in the field of radioprotection, or in the management of radioactive waste, or even when dismantling nuclear installations, or performing radiological characterization after an accident.

After an irradiating source has been detected, the question of determining the radiation level that it is generating arises. Radiation level is generally expressed in dose rate, the conventional unit being Gy/h, or equivalent dose rate, the conventional unit being Sv/h. Dose rate corresponds to an amount of energy released per unit volume, whereas equivalent dose rate is a unit used for radioprotection purposes and which quantifies the biological damage caused by the radiation. When the irradiation is caused by the photons, the equivalent dose rate corresponds to the dose rate.

Estimation of the dose rate produced by an irradiating source firstly requires the emission energy of the source to be known. Use of a spectrometric gamma camera allows this information to be obtained.

Moreover, the dose rate produced by an irradiating source varies as a function of the distance to the source. When an irradiating source is point-like, it is known that the irradiation varies as a function of one over the square of the distance. Thus, on the basis of an estimation of the dose rate at a point, located at a known distance from an irradiating source, it is possible to estimate the dose rate produced by the irradiating source at any point in the observation field, provided that the irradiating source may be considered to be point-like. However, when it is sought to estimate irradiation in proximity to the irradiating source, the assumption of point-likeness is no longer necessarily valid.

A difficulty arises when the irradiating sources are areal sources. Specifically, in such situations, it is necessary to take into account the spatial distribution of the irradiating sources. It is possible to generate models using computational codes, but this takes time and remains subject of the validity of the adopted model, and in particular of geometric assumptions as to the extent and uniformity of the irradiating source.

The inventor provides a method allowing a map of the irradiation, in the form of dose rates or equivalent dose rates, of an installation comprising areal irradiating sources that are not necessarily uniform to be generated. By areal source, what is meant is a source that cannot be considered to be point-like.

SUMMARY OF THE INVENTION

A first subject of the invention is a method for estimating a dose rate, on the basis of measurements taken by a gamma camera, the gamma camera defining an observation field, the method being such that:
  the estimated dose rate originates from irradiating sources located in the observation field, the irradiating sources emitting ionizing electromagnetic radiation;
  the observation field is discretized into a mesh;
    the gamma camera comprises pixels, each pixel being configured to detect the ionizing electromagnetic radiation, during an acquisition time, and to form an energy spectrum therefrom, each pixel being associated with at least one point of the mesh, such that together the pixels allow a spatial distribution of the irradiating sources in the observation field to be obtained in one energy band or in a plurality of energy bands;
  the method comprising the following steps:
  a) acquiring spectra with the pixels;
  b) taking into account an emission spectrum, the emission spectrum being defined in one or more energy bands;
  c) selecting points of the mesh;
  d) on the basis of the spectra acquired by each pixel, estimating a spatial distribution of an activity, corresponding to the emission spectrum taken into account in step b), for the selected mesh points;
  e) in each energy band of the emission spectrum, taking into account a pre-established conversion function relating a dose rate to a photon flux detected by the gamma camera;
  f) on the basis of the conversion function resulting from step e), and of the spatial distribution of activity determined in step d), estimating a dose rate generated, at the gamma camera, by the set of points selected in step c).

By photon flux detected by the gamma camera, what is meant is a photon flux detected by a pixel of the gamma camera. In step f), the estimated dose rate corresponds to the dose rate corresponding to the emission spectrum taken into account in step b).

By dose rate, what is meant is dose rate or equivalent dose rate.

According to one embodiment:
step b) takes into account an isotope, or a set of isotopes, potentially present in the observation field, the emission spectrum corresponding to the emission spectrum of the isotope or to the emission spectrum of the set of isotopes;
step d) comprises estimating a spatial distribution of an activity of the isotope or of the set of isotopes in the observation field.

The dose rate estimated in step f) then corresponds to the dose rate generated by the isotope or set of isotopes taken into account.

The method may include any one of the following features, taken alone or in technically feasible combinations:
In step b), the emission spectrum taken into account comprises one or more energy bands.
Step d) takes into account a spatial model associated with each pixel of the image, the spatial model defining a probability that a photon emitted by each point of the mesh is detected by the pixel with which the spatial model is associated.
In step d), the spatial distribution of the activity corresponds to a distribution of the activity over an object surface.
The conversion function is estimated by simulation or the conversion function is estimated by exposing at least one pixel of the gamma camera to a calibration irradiating source, such that the dose rate to which the pixel is exposed is known.
Step d) comprises, in each energy band of the emission spectrum, and for each pixel:
estimating a photon flux detected by the pixel in the energy band, depending on a spatial distribution of the activity of the selected points of the mesh;
on the basis of the spectrum detected by the pixel, determining, in the energy band, the photon flux detected by the pixel;
step d) further comprising, in each energy band, and for each pixel, minimizing a discrepancy between the estimated photon flux and the measured photon flux.
The gamma camera is associated with a rangefinder, for measuring a distance between the gamma camera and the observed scene. The method may further comprise, for example following step f):
g) measuring a distance between the gamma camera and at least one point of the observation field;
h) using the distance measured in step g) and the spatial distribution of activity estimated in step d), estimating a dose rate generated, by the spatial distribution of the activity, in a position different from the position occupied by the gamma camera.
Step h) may take into account the dose rate estimated in step f).
The dose rate estimated in step f) is an equivalent dose rate.
Step c) comprises selecting all or some of the points of the mesh of the observation field.

A second subject of the invention is a measuring device, comprising:
a gamma camera comprising pixels, each pixel being configured to detect ionizing electromagnetic radiation, emitted by at least one irradiating source located in an observation field of the gamma camera, during an acquisition time, and to form an energy spectrum therefrom, each pixel being associated with at least one point of the mesh of the observation field, such that together the pixels allow a spatial distribution of each irradiating source in the observation field to be obtained in one energy band or in a plurality of energy bands;
a processing unit, configured to:
receive spectra acquired by a plurality of pixels of the gamma camera;
implement at least steps b) to f) of a method according to the first subject of the invention on the basis of the acquired spectra.

The invention will be better understood on reading the description of the exemplary embodiments, which are described, in the rest of the description, with reference to the figures listed below.

FIGURES

Figure 1B:
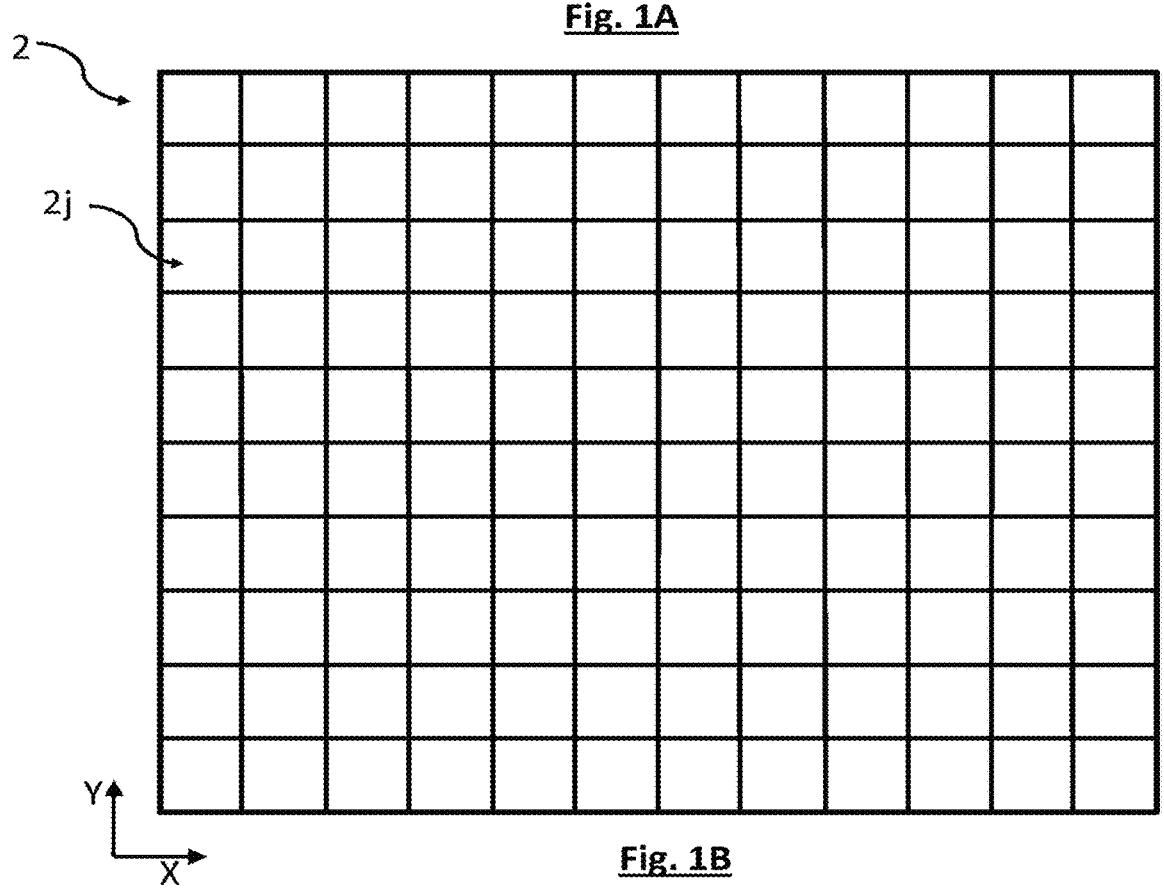
Figure 1C:
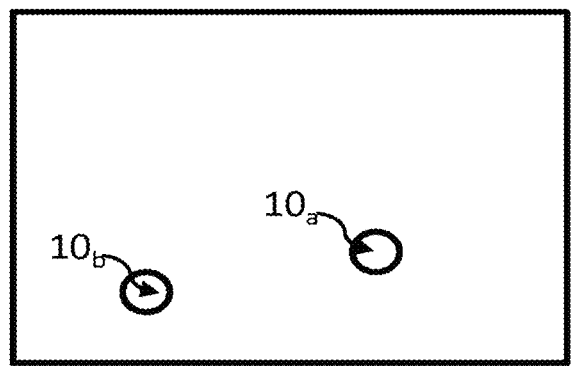
Figure 2:
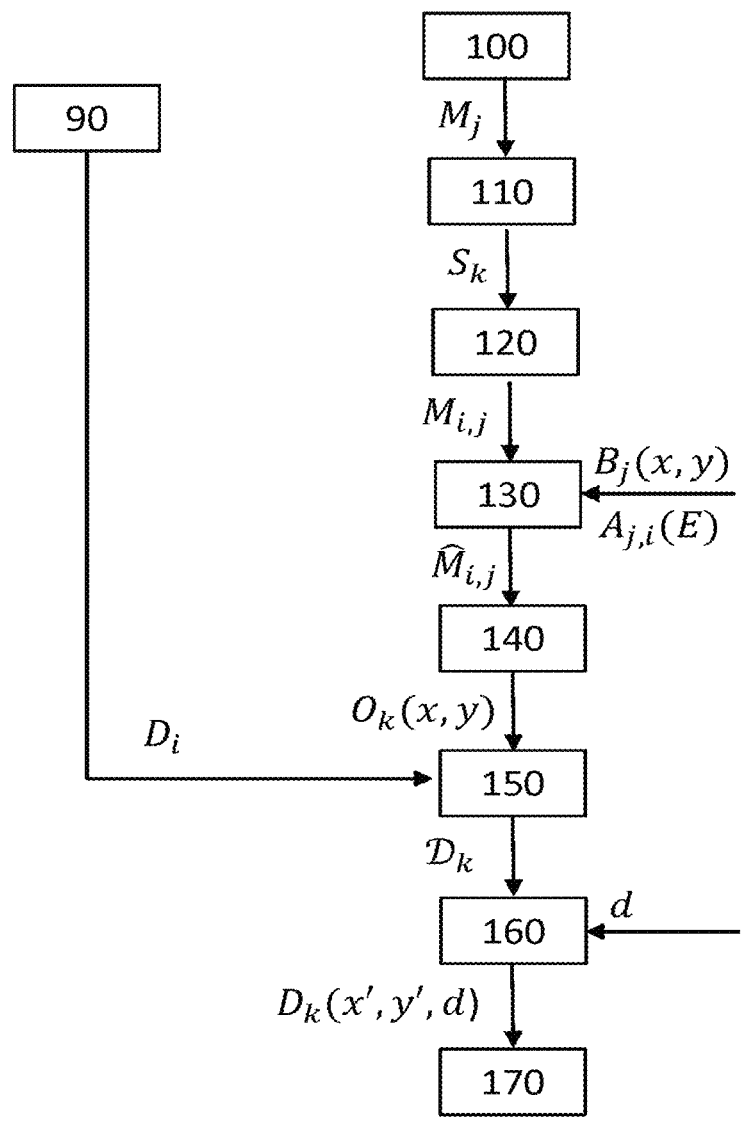
Figure 3:
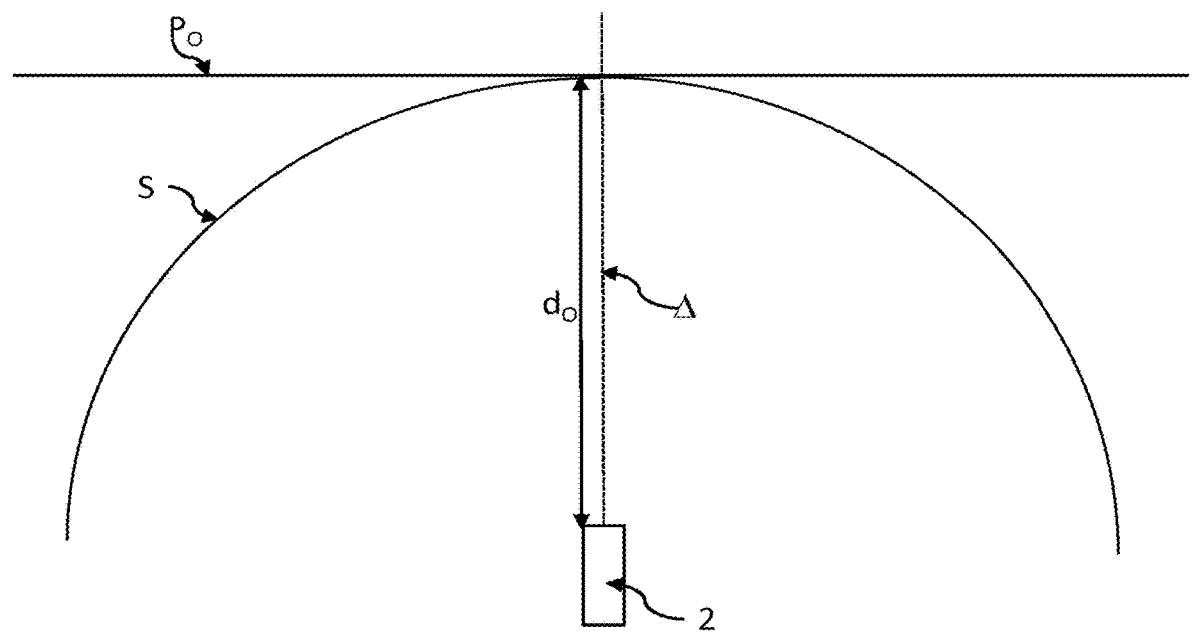
Figure 4A:
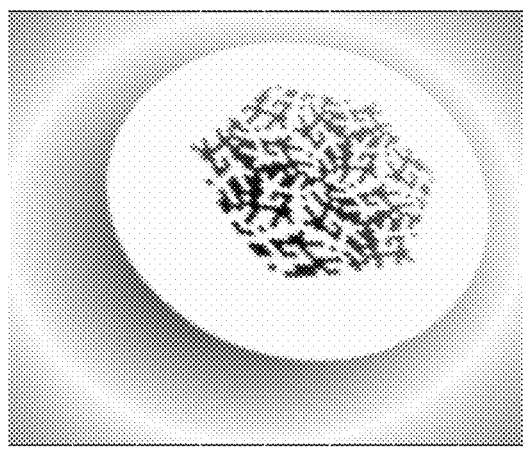
Figure 4B:
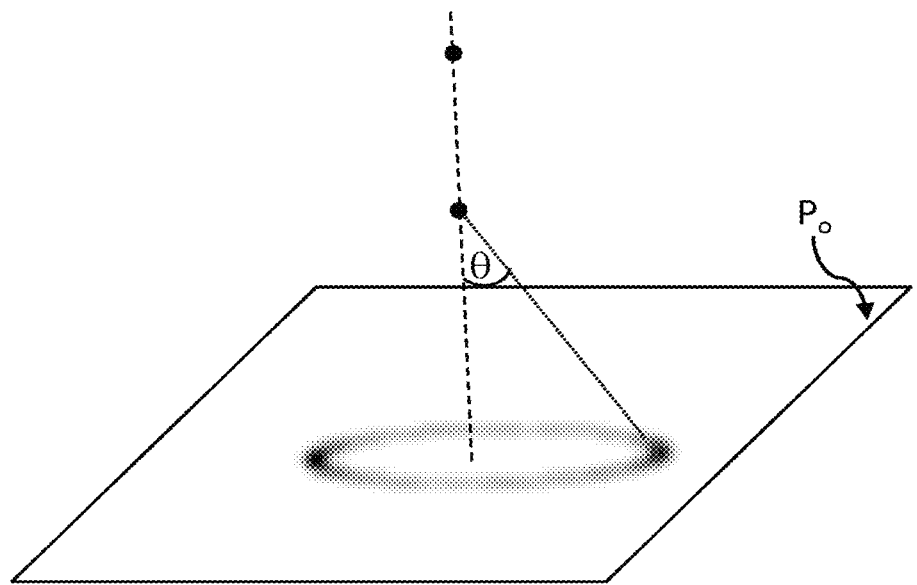
Figure 4C:
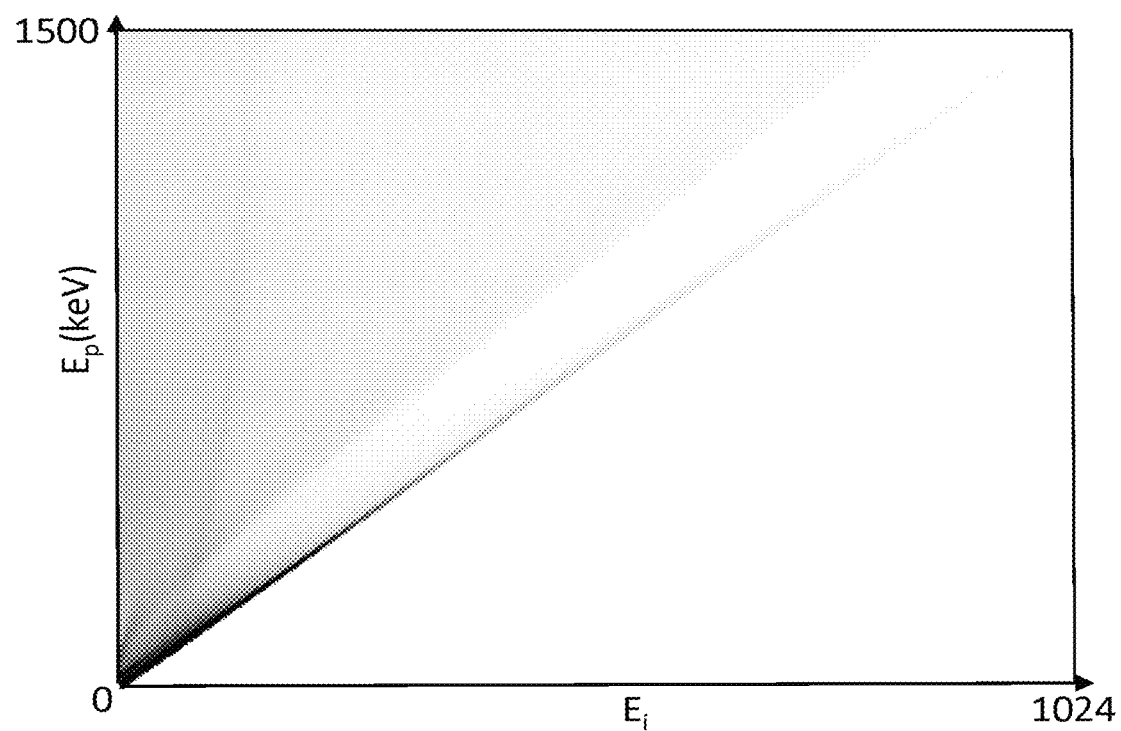
Figure 5:
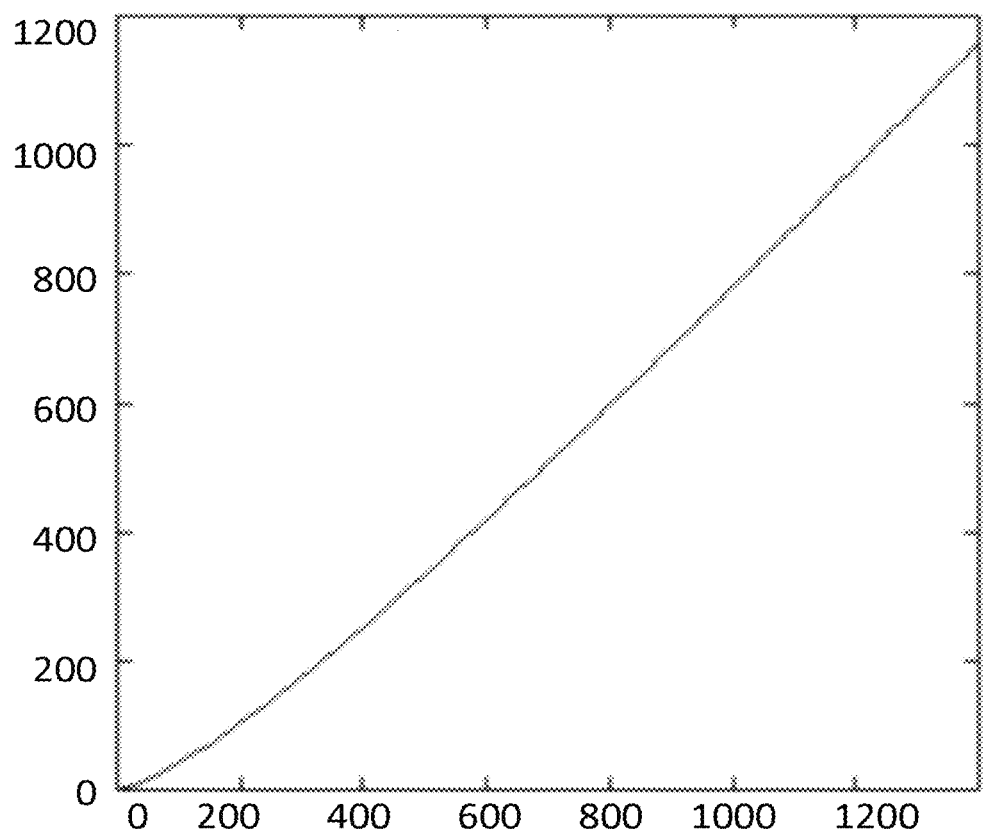
Figure 6A:
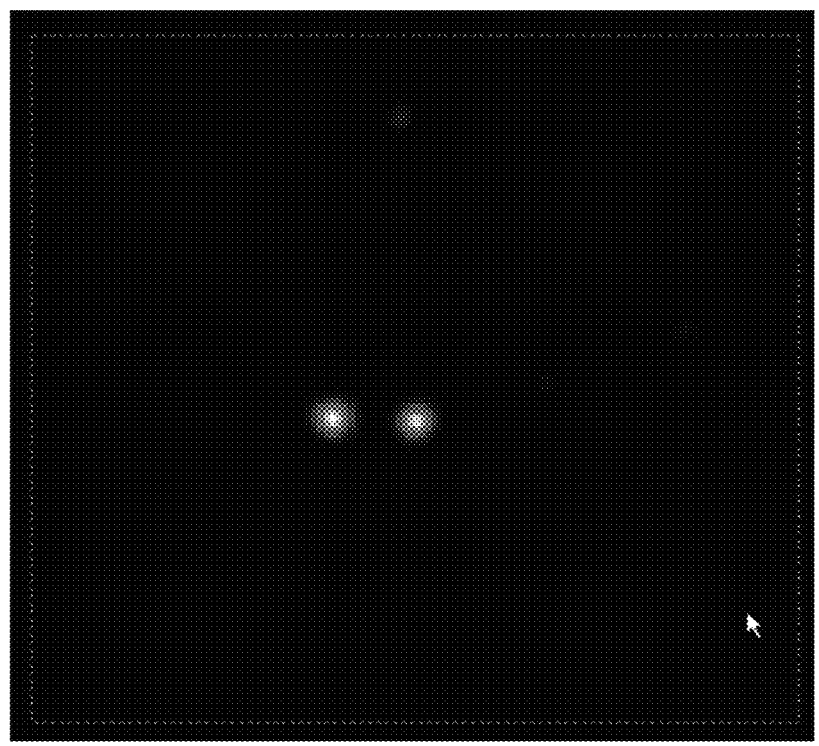
Figure 6B:
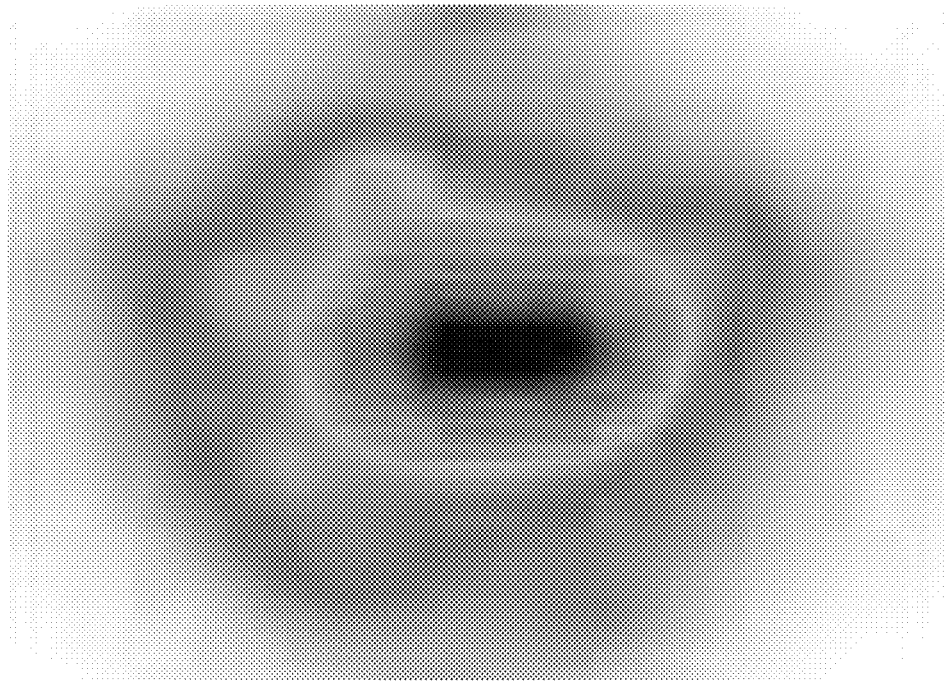
Figure 6C:
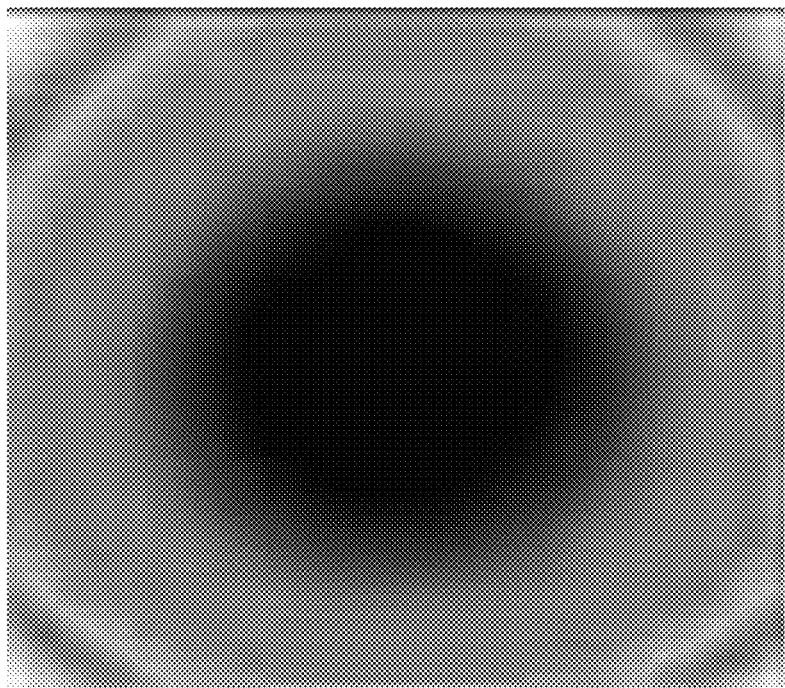

FIG. 1A schematically shows a gamma camera.
FIG. 1B schematically shows pixels of a gamma camera.
FIG. 1C schematically shows an image, obtained by the gamma camera, in one energy band.
FIG. 2 shows the main steps of a method according to the invention.
FIG. 3 shows a position of the radiating sources on a planar object surface.
FIG. 4A shows an example of a spatial response function of a gamma camera, comprising a coded-aperture collimator.
FIG. 4B shows an example of a spatial response function of a Compton gamma camera.
FIG. 4C shows an example of a spectral response matrix of a pixel of a gamma camera.
FIG. 5 shows a dose rate-energy conversion function, as a function of energy.
FIGS. 6A, 6B and 6C are examples of implementation of the invention.

DESCRIPTION OF PARTICULAR EMBODIMENTS

FIG. 1A shows a measuring device 1 allowing the invention to be implemented. The measuring device comprises a gamma imager 2, or gamma camera. The gamma imager is configured to detect ionizing electromagnetic rays, of X-ray or gamma-ray type, the energy of which is generally comprised between 10 keV and 10 MeV, in an observation field Ω. The observation field extends about a central axis Δ. The device may comprise a rangefinder 3, coupled to the gamma camera, as described below.

The gamma camera comprises pixels $2_j$, each pixel corresponding to an elementary spatial region of the observation field. Pixels are shown in FIG. 1B. When the elementary spatial region corresponding to a pixel comprises an irradiating source emitting X-rays or gamma rays, some of the radiation emitted by the source reaches the pixel and is detected by the latter. Thus, the amplitude of the signal of a pixel of the gamma image increases as the elementary spatial region with which it is associated becomes more irradiant, i.e. emits more X-ray or gamma ray radiation. In the rest of the description, the examples are given in relation to sources of gamma irradiation, this corresponding to the most frequent case of application. It is directly transposable to sources of X-ray irradiation.

Generally, the pixels $2_j$ are coplanar and distributed in a two-dimensional matrix array, preferably regularly. The matrix array may for example comprise 512×512 pixels, or even more. Each pixel $2_j$ is an elementary radiation detector.

The gamma imager may be a Compton gamma camera, a pinhole-collimator gamma camera or coded-aperture gamma camera. It may also be a question, non-exhaustively, of a gamma camera the collimator of which comprises parallel channels, or convergent channels, or divergent channels. Thus, the term gamma camera corresponds to an imager having an observation field and configured to form an image allowing irradiating sources to be located in the irradiation field. Whatever the type of gamma imager, it allows a gamma image comprising pixels, each pixel corresponding to one elementary spatial region of the observation field, to be formed. The observation field Ω may be discretized at coordinates (x,y) into a mesh. Each pixel may thus be associated with one or more points of the mesh. When a Compton gamma camera is being used, the correspondence between pixels and points of the mesh varies depending on the detected interactions.

Preferably, each pixel $2_j$ performs a spectrometric function, in the sense that it allows the radiation detected, during an acquisition time, to be separated spectrally into various spectral bands, or energy bands. When this type of pixel is used, it is possible to form various gamma images of a given observation field, each image corresponding to one energy band (denoted $E_i$). The width $dE_i$ in each energy band $E_i$ is variable and depends on the performance of the pixels in terms of energy resolution. The width of each energy band may be about 1 keV, or a few keV, or a few tens of keV.

The acquisition time T of a spectrum, by each pixel, depends on the photon flux to which the pixel is exposed. It may be a few tens of ms, or a few seconds, and may last several minutes, or even several hours. The gamma spectrum acquired by each pixel may then comprise intensity peaks corresponding to emission intensities of known isotopes.

It is known that an emission spectrum $S_k$ is associated with each isotope k. Such an emission spectrum corresponds to a histogram of the emission rate as a function of energy. By emission rate, what is meant is an emitted number of photons corresponding to a unit activity of the isotope. Generally, the unit activity is 1 Bq. Thus, the emission spectrum corresponds to a number of photons emitted, in each energy band $E_i$ for the unit activity in question, in the present case 1 Bq.

A gamma image may be established by considering a combination of spectral bands, which correspond to the emission spectrum $S_k$ of an isotope. The combination may be a weighted sum. The image is then representative of a spatial distribution of the activity of the isotope in question.

In the example schematically shown in FIG. 1C, two irradiating sources $10_a$, $10_b$, emitting in a spectral band centered on 661.66 keV, this corresponding to the isotope $^{137}$Cs, have been shown. The higher the photon flux detected by the pixels, in this energy band, the higher the brightness of the pixels shown in the image.

With certain gamma imagers, in particular Compton gamma cameras or coded-aperture gamma cameras, the image acquired by the imager does not allow the irradiating sources in the observation field to be viewed directly. The acquired image undergoes processing, taking into account a response function of the camera, so as to allow a gamma image in which the intensity of each pixel corresponds to a flux of detected photons, originating from each point of the mesh, to be obtained in each energy band.

A processing unit 4 receives the spectra acquired by each pixel $2_j$ of the gamma camera 2. The image-processing unit is notably configured to perform the operations described with reference to FIG. 2.

The observation field Ω is meshed, in such a way as to be discretized into points. Since the observation field is not known a priori, it may be likened to a virtual object surface $P_O$ on which each observation point has coordinates (x,y). An important element of the invention is that the points of the object frame of reference are considered to belong to the same object surface $P_O$.

According to a first approach, which is simple to implement, the object surface $P_O$ is a planar surface. The angular observation field Ω of the gamma camera, which extends about the optical axis Δ, describes a segment of a sphere S (see FIG. 3). The object surface $P_O$ corresponds to a plane, tangent to the sphere S, and perpendicular to the optical axis Δ. The irradiating sources present in the observation field are considered to be coplanar and to belong to the object plane. The distance between the detection plane and the object surface is an arbitrary distance, which may not be known. When the device comprises a rangefinder 3, the distance between the object surface and the camera is established by at least one distance measurement performed by the rangefinder. The rangefinder may be a LIDAR, allowing a distance to be obtained for a multitude of points of the observation field. The observation field may then be considered to be a non-planar surface, defined by the distances measured at a multitude of points.

Each pixel of the gamma camera is characterized by a spatial response function and a spectral response function.

A spatial response function $B_j(x, y)$ is established for each pixel $2_j$. The spatial response function corresponds to a probability that a photon, emitted by a point (x, y) of the observation field, is detected by the pixel $2_j$. Thus, each pixel $2_j$ has a spatial response function $B_j(x,y)$ established for all or some of the points (x, y) of the observation field Ω. The spatial model may be established analytically or by modelling. The spatial response function may be established for an isotope k, in which case it is denoted $B_{j,k}(x, y)$. It quantifies a probability that a photon, emitted by an isotope k, at a point (x, y) of the observation field, is detected by the pixel $2_j$.

FIG. 4A shows a spatial-response model for a gamma camera employing a coded aperture. The spatial model shown corresponds to an angular field of 180° by 180°. FIG. 4B shows a spatial-response model when the gamma camera is a Compton gamma camera. In such a configuration, the spatial-response model varies depending on the detection of the interactions. In the model shown in FIG. 4B, the dashed line represents a direction defined by the detection of two interactions, the latter being represented by the black dots. The spatial model is defined by a scattering angle θ defined by the measurement of the energies released by each interaction. In FIGS. 4A and 4B, the lower the greyscale level, i.e. the darker the tone, the higher the probability of emission of a photon.

The spatial model may also be determined for a preset isotope. In this case, the spatial model takes into account the emission energies and their respective branching ratios. The spatial model then allows a probability of presence of the isotope to be established.

FIG. 4C shows a spectral response function $A_j$ established for each pixel $2_j$. The spectral response function $A_j$ corresponds to a probability that an incident photon, having an energy $E_p$, is considered, following detection by the pixel $2_j$, to have an energy $E_1$. In other words, the spectral response function $A_j$ establishes a link between the measured energy $E_i$ and the incident energy $E_p$. The spectral response function shown in FIG. 4C is a response matrix. The response matrix is of P×I size, where I is the number of channels of each spectrum formed by the pixel $2_j$ and P is the number of channels (energy bins) into which the incident spectrum is discretized. Each term $A_j(E_p, E_i)$ of the response matrix represents a probability that a photon incident on the detector, of energy $E_p$, is considered by the pixel $2_j$ as having an energy $E_i$ Below, the response matrix is considered to be identical for each pixel, and it is denoted A.

Each row $A(E_p,.)$ of the matrix, such as shown in FIG. 4C, corresponds to a probability distribution of the energy $E_i$ detected by the detector when a photon incident on the detector has an energy $E_p$. Each column $A(.,E_i)$ of the matrix, such as shown in FIG. 4C, corresponds to a probability distribution of the incident energy $E_p$ when a photon detected by the pixel has an energy $E_i$. Below, each column $A(.,E_i)$ is designated $A_i$. In FIG. 4C, the darker the greyscale level, the higher the probability. In the case of a pixel $2_j$ behaving as a perfect detector, the matrix A is the identity matrix.

The main steps of a method for estimating a dose rate produced by one or more irradiating sources located in the observation field of a gamma camera will now be described with reference to FIG. 2.

Step 100: Acquiring a Spectral Image M.

In this step, a spectral image M is acquired, for an acquisition time that is sufficient to allow exploitable spectra to be obtained by the pixels $2_j$ of the camera. The spectral image M is composed of spectra $M_j$, each spectrum being acquired by one pixel $2_j$ during an acquisition period. Each spectrum $M_j$ comprises photon flux $M_{i,j}$ detected in energy bands $E_i$. The flux $M_{i,j}$ is the number of photons detected by the pixel $2_j$ in an energy band $E_i$ per unit time.

Step 110: Selecting one or more energy bands, forming an emission spectrum $S_k$. In this step, for various pixels $2_j$, one or more energy bands are selected. This selection may be made beforehand. This is notably the case when the isotope or isotopes liable to be present in the observation field is/are known beforehand. It is conventional to base the selection on a list containing about ten or a few tens of potentially present gamma-emitting isotopes, the respective emission spectra of which are known. In certain nuclear installations, the list may contain only a few isotopes, considered to be preponderant, or even a single isotope. Below, each isotope is represented by an integer k, comprised between 1 and K·K is the number of potential isotopes. As indicated above, each isotope k is associated with an emission spectrum $S_k$. The emission spectrum of an isotope comprises emission energies (the latter being discretized) and the branching ratio associated with each energy. The branching ratio corresponds to an emission probability.

According to one alternative, a plurality of isotopes may be selected, and an emission spectrum formed from a combination of the emission spectra of each isotope. The combination is for example a weighted sum. It is thus possible to form an emission spectrum comprising a predefined mixture of isotopes.

According to one possibility, the emission spectrum comprises only a single energy (for example 661.66 keV when $^{137}$Cs is of interest), or a plurality of discrete energy bands (for example 1173 keV and 1332 keV when $^{60}$Co is of interest).

Step 120: Determining the Flux Detected in Each Energy Band.

In this step, for each pixel $2_j$, the photon flux $M_{i,j}$ detected in each energy band $E_i$ selected in step 110 is determined. The flux $M_{i,j}$ corresponds to the number of photons detected in the energy band $E_i$ per unit time.

Step 130: Modelling the Detected Flux

In this step, a photon flux $\hat{M}_{i,j}$ that would be detected by each pixel $2_j$ if each isotope k on the object surface $P_O$ had an apparent activity $O_k(x, y)$ is modelled. The apparent activity $O_k(x,y)$ corresponds to an activity of the isotope when each point of the observation field is considered to belong to the object surface $P_O$. It will be recalled that the activity of an isotope corresponds to a number of disintegrations per second. Depending on the apparent activity $O_k(x, y)$, the flux $\hat{M}_{i,j}$ detected by each pixel $2_j$, in an energy band $E_i$, is such that:

$$\hat{M}_{i,j} = \sum_k \left[ \left( \int A_i(E) \times S_k(E) dE \right) \times \left( \int B_{j,k}(x, y) \times O_k(x, y) dx dy \right) \right] \quad (1)$$

where:
x is an elementwise product (Hadamard product);
$A_i(E)$ is a vector of (1,I) size, corresponding to a column of the matrix A for energy channel i;
$S_k(E)$ is the emission spectrum of the isotope k, discretized into I energy bands; it takes the form of a vector of (1,I) size;
$B_{j,k}(x, y)$ is a spatial response function associated with the pixel $2_j$ of an isotope k; it is a matrix of (X, Y) size, where X and Y are the dimensions of the observation surface $P_O$ discretized into coordinates (x, y),
$O_k(x,y)$ is a spatial distribution of the apparent surface activity. It is a matrix of (X, Y) size;
$\hat{M}_{i,j}$ is a scalar quantity. It will be noted that expression (1) comprises a sum over each isotope k in question.

The contribution $\hat{m}_{k,i,j}$ of the isotope k in the energy band $E_i$ within pixel $2_j$ is such that $$\hat{m}_{k,i,j} = \left( \int A_i(E) \times S_k(E) dE \right) \times \left( \int B_{jk}(x, y) \times O_k(x, y) dx dy \right) \quad (2)$$

with $$\hat{M}_{i,j} = \sum_k \hat{m}_{k,i,j} \quad (3)$$

Step 140: Determining the Apparent Activity

In step 140, in each energy band $E_1$, and for each pixel $2_j$, the flux $M_{i,j}$ detected in step 120 is compared with the flux $\hat{M}_{i,j}$ modelled in step 130. It is a question of finding, for each isotope k in question, the matrix $O_k(x, y)$ that minimizes an error, for example a squared error, between $M_{i,j}$ and $\hat{M}_{i,j}$.

Thus, $$O_k(x, y) = \underset{O_k(x,y)}{\operatorname{argmin}} \sum_j |\hat{M}_{i,j} - M_{i,j}| \quad (4)$$

According to one preferred embodiment, the minimization may be of Poisson type, such that:

$$O_k(x, y) = \underset{O_k}{\operatorname{argmin}} \sum_{i,j} \left( \hat{M}_{i,j} - M_{ij} \ln \hat{M}_{i,j} \right) \quad (5)$$

Such a minimization may be achieved using an MLEM algorithm (MLEM standing for Maximum Likelihood Expectation Maximization), such algorithms being known to those skilled in the art.

At the end of step 140, as many images $O_k(x, y)$ as there are isotopes in question will have been obtained.

When an isotope, $^{60}$Co for example, has various emission lines, in various energy bands, the images $O_k(x, y)$ correspond to a spatial distribution of the activity of the isotope, which takes into account the emission spectrum $S_k$ of the isotope.

Step 150: Estimating the Dose Rate

In step 150, the dose rate is estimated for at least one isotope k, or even for each isotope k for which a significant apparent activity $O_k(x, y)$ has been detected at at least one point (x,y) of the mesh.

The dose rate generated by the isotope k on the pixels of the gamma camera is such that:

$$\mathcal{D}_k = \sum_i \sum_j \left[ \left( \int A_i(E) \times S_k(E) dE \right) \left( \int B_{j,k}(x, y) \times O_k(x, y) dx dy \right) \right] \times D_i \quad (6)$$

This may also be written:

$$\mathcal{D}_k = \left[ \sum_i \left( \int A_i(E) \times S_k(E) dE \right) \times D_i \right] \times \left[ \sum_j \left( \int B_{j,k}(x, y) \times O_k(x, y) dx dy \right) \right] \quad (6')$$

The scalar $D_i$ is the value, in the energy band $E_i$, of a conversion function D that converts the photon flux in the dose rate. The conversion function D is established in each energy band $E_i$ in a calibrating step 90 described below.

$\mathcal{D}_k$ is the dose rate, conventionally expressed in Gy/h, or the equivalent dose rate, conventionally expressed in Sv/h, corresponding to the emission spectrum taken into account. The various dose rates $\mathcal{D}_k$, corresponding to various isotopes k or to various emission spectra $S_k$, respectively, may be estimated and each of these dose rates summed.

Step 150 allows an estimation of the dose rate produced by all or some of the isotopes k within the observation field to be obtained. This functionality allows a distribution of the various isotopes in the observation field to be evaluated.

Steps 110 to 150 may be carried out for the entire observation field, or for certain points of the observation field. It may for example be a question of points selected by an operator, on the basis of the spectrum image acquired in step 100. It may for example be a question of a particular region of the observation field, comprising a particular irradiating source.

The method may also comprise the following steps.

Step 160: Estimating the Dose Rate Depending on Distance

The gamma camera may be associated with a rangefinder 3, so as to estimate a distance between the gamma camera and various points of the observation field. The rangefinder may be optical or acoustic or electromagnetic. The distance $d_O$ corresponds to the distance between the camera and the object surface $P_O$.

It is then possible to estimate, simply, a dose rate at various distances. To this end, the estimation of the apparent activity $O_k(x,y)$, i.e. the activity on the object surface $P_O$, is used as starting point. If x' and y' represent the coordinates of a measurement point parallel to the object surface $P_O$ and located at a distance d from the object surface, the dose rate, at this point, generated by an isotope k, may be estimated using the expression:

$$\mathcal{D}_k(x', y', d) = c_k \times \int \int \frac{O_k(x, y)}{d^2 + (x' - x)^2 + (y' - y)^2} dx dy \quad (7)$$

where $c_k$ is a factor that allows the distance to be taken into account, this factor being described below.

In the system of the coordinates x' and y', any point located on the optical axis of the camera has the coordinates (0, 0).

The factor that allows the distance to be taken into account is obtained via a measurement of the distance $d_O$ between the gamma camera and the object surface $P_O$. The following is then obtained:

$$c_k = \frac{\mathcal{D}_k(0, 0, d_o)}{\int \int \frac{O_k(x,y)}{d_o^2 + (x)^2 + (y)^2} dx dy} \quad (8)$$

With $\mathcal{D}_k(0, 0, d_o) = \mathcal{D}_k$, $\mathcal{D}_k$ being the dose rate resulting from step 150: see either of expressions (6) and (6').

It will be understood that the obtainment of an apparent activity $O_k(x,y)$, as a result of step 140, allows a dose rate to be estimated for various points of the observation field at various distances with respect to the object plane. This however assumes knowledge of a distance $d_O$ between the gamma camera and the object surface, so as to be able to compute the factor $c_k$ that allows the distance to be taken into account.

In the embodiment described above, the object surface is considered to be a planar surface. Considering the irradiating sources to be distributed over such a surface makes it possible to avoid the need for a three-dimensional reconstruction of each irradiating source. It is therefore a simplifying assumption, avoiding the need for complex computing means. According to one variant, a measurement of a distance between the camera and a plurality of points of the observation field is available. This measurement may be obtained by a range finding sensor, a LIDAR sensor for example, performing a scan along the observation field. In this case, the object surface is then a non-planar surface. It is defined depending on the distance between the camera and the various points, of the mesh, for which a distance to the camera was determined.

The method described above assumes a prior calibration, so as to determine the conversion coefficient $D_i$ in a plurality of energy bands. This is the subject of step 90.

Step 90: Determining the Dose Rate-Photon Flux Conversion Function

The dose rate, at the energy E, is obtained using a conversion function that is obtained empirically:

$$D(E) = \beta \cdot E \cdot \left( 1 - e^{-\left(\frac{E}{E_0}\right)^\alpha} \right) \quad (9)$$

The conversion function D(E) allows a conversion to be performed between a dose rate and a photon flux detected, at the energy E, by a pixel of the gamma camera.

The parameters $\beta$, $\alpha$ and $E_0$ may be determined by simulation.

$\beta = 3.5 \times 10^{-11}$ (Sv/h)/(keV/s);

$\alpha = 0.45$;

$E_0 = 400$ keV.

Since the parameters $\beta$, $\alpha$ and $E_0$ are known, expression (9) allows a conversion function to be obtained for various energies.

The parameters of the conversion function D(E) may also be determined experimentally. This step is carried out by exposing the gamma camera to a calibration source, which generates a known emission spectrum. The irradiating source may for example be monoenergetic, though this condition is not absolutely necessary. The dose rate $D_i$ generated, at the camera, by the source, in an energy band $E_i$, is well characterized.

It is possible to show that the dose rate to which each pixel of the gamma camera is exposed is:

$$\mathcal{D} = \int S(E) \times \frac{D_\theta(E)}{T} dE \qquad (10)$$

where T is the acquisition time and S(E) is the spectrum acquired by a pixel during the acquisition time. $\theta$ is the set of parameters of the conversion function i.e. $\beta$, $\alpha$ and $E_0$.

During the calibration, a number Q of acquisitions of spectra $S_q(E)$ are carried out using one or more pixels of the gamma camera. During each acquisition, the camera is exposed to a dose rate $\mathcal{D}_q$ which is known because the calibration source is known and the distance between the calibration source and the gamma camera is also known. Thus, for each acquisition, it is possible to write:

$$\mathcal{D}_q = \int S_q(E) \times \frac{D_{\theta,q}(E)}{T_q} dE \qquad (11)$$

where $T_q$ is the acquisition time of each spectrum and $D_{\theta,q}(E)$ is the conversion function given by expression (9) during each acquisition.

The parameters $\theta$ of the conversion function may be estimated by minimizing the discrepancy between $D_q$ and each integral $$\int S_q(E) \times \frac{D_{\theta,q}(E)}{T_q} dE,$$

the latter being parameterized by the set of parameters $\theta$. Thus, an error is minimized, between the dose rate to which the camera is actually exposed, and the estimation of this dose rate using the conversion function according to expression (9).

Thus $$\hat{\theta} = \underset{\theta}{\mathrm{argmin}} \sum_q \left[ \mathcal{D}_q - \int S_q(E) \times \frac{D_{\theta,q}(E)}{T_q} dE \right]^2 \qquad (12)$$

$\hat{\theta}$ is the estimation of the optimal parameters of the conversion function.

In expressions (6) and (6'), the coefficient $D_i$ is such that:

$$D_i = D_{\hat{\theta}}(E_i) \qquad (13)$$

$\hat{\theta}$ corresponds to the parameters of the conversion function, which are estimated either by modelling or by experimental calibration.

FIG. 5 shows an example of a conversion function. The conversion function may be established for one pixel, and be applied to all the pixels.

Trials have been carried out using a gamma camera comprising CdZnTe pixels and using two point $^{57}$Co sources. FIG. 6A shows an image obtained, at a distance of 1 meter. The equivalent dose rate, generated by each source, in contact, is 91.7 µSv/h and 81.2 µSv/h, respectively.

On the basis of the measurement shown in FIG. 6A, equivalent dose rates at 5 cm (see FIG. 6B) and 1 m (see FIG. 6C) were respectively estimated. The values were 50 µSv/h and 0.4 µSv/h. These are the dose rates generated by both sources.

The invention is applicable to various nuclear installations, or, more generally, to operations of seeking for and characterizing radioactive sources.

The invention claimed is:

1. A method for estimating a first dose rate generated at a gamma camera, based on measurements taken by the gamma camera, wherein the estimated first dose rate originates from irradiating sources located in an observation field, the irradiating sources emitting ionizing electromagnetic radiation, the observation field is discretized into a mesh, the gamma camera comprises a plurality of pixels, each pixel being configured to detect the ionizing electromagnetic radiation, during an acquisition time, and to form a pixel corresponding energy spectrum therefrom such that the pixels allow a position of the irradiating sources in the observation field to be obtained, the method comprising:
    with the gamma camera at a predetermined position, acquiring the pixel corresponding energy spectrum at each pixel of the plurality of pixels of the gamma camera;
    selecting an emission spectrum, the emission spectrum having one or more energy bands;
    selecting points of the mesh of the observation field;
    based on the pixel corresponding energy spectrum acquired by each pixel of the plurality of pixels of the gamma camera, estimating a spatial distribution of an activity, corresponding to the selected emission spectrum for the selected points of the mesh;
    for each energy band of the emission spectrum, determining a corresponding conversion function relating a photon flux value to a dose rate value for the energy band; and
    based on the determined corresponding conversion function for each energy band of the emission spectrum and the estimated spatial distribution of the activity, estimating the first dose rate generated, at the gamma camera, by the selected points of the mesh,
    wherein the estimating the spatial distribution comprises, in each energy band of the emission spectrum, and for each pixel of the plurality of pixels:
    determining an estimated photon flux estimated to be detected by the pixel in the energy band, depending on the spatial distribution of the activity of the selected points of the mesh;
    based on the pixel corresponding energy spectrum acquired at the pixel, determining, in the energy band, a measured photon flux detected by the detector element; and
    minimizing a discrepancy between the estimated photon flux and the measured photon flux.

2. The method as claimed in claim 1, wherein:
    the selecting the emission spectrum comprises selecting an isotope, or a set of isotopes, potentially present in the observation field, the selected emission spectrum corresponding to a first emission spectrum of the isotope or to a second emission spectrum of the set of isotopes; and the estimating the spatial distribution of the activity comprises estimating a first spatial distribution of a first activity corresponding to the isotope or estimating a second spatial distribution of a second activity corresponding to the set of isotopes.

3. The method as claimed in claim 1, wherein the selected emission spectrum comprises a single energy band.

4. The method as claimed in claim 1, wherein the determining the spatial distribution comprises determining the spatial distribution using a spatial model associated with each pixel of the plurality of pixels, the spatial model defining a probability that a photon emitted by each point of the mesh is detected by the pixel with which the spatial model is associated.

5. The method as claimed in claim 1, wherein the spatial distribution of the activity corresponds to a distribution of the activity over an object surface.

6. The method as claimed in claim 1, wherein the determining the corresponding conversion function comprises estimating the corresponding conversion function by simulation.

7. The method as claimed in claim 1, wherein the determining the corresponding conversion function comprises estimating the corresponding conversion function by exposing at least one pixel of the plurality of pixels of the gamma camera to a calibration irradiating source, such that a calibration dose rate to which the pixel is exposed is known.

8. The method as claimed in claim 1, wherein the gamma camera is associated with a rangefinder, and
wherein the method further comprises:
measuring, with the rangefinder, a distance between the gamma camera and at least one point of the observation field; and
using the measured distance and the estimated spatial distribution of the activity, estimating a second dose rate generated, by the estimated spatial distribution of the activity, in a second position different from the predetermined position of the gamma camera.

9. The method as claimed in claim 8, wherein the estimating the second dose rate in the second position different from the predetermined position of the gamma camera is based on the estimated first dose rate at the gamma camera.

10. The method as claimed in claim 1, wherein the estimated first dose rate is an equivalent dose rate.

11. The method as claimed in claim 1, wherein the selecting the points of the mesh comprises selecting all of the points of the mesh of the observation field.

12. A measuring device, comprising:
a gamma camera comprising a plurality of pixels, each pixel being configured to detect ionizing electromagnetic radiation, emitted by at least one irradiating source located in an observation field discretized into a mesh, during an acquisition time, and to form a pixel corresponding energy spectrum therefrom such that together the plurality of pixels allow a spatial distribution of each irradiating source in the observation field to be obtained in one energy band or in a plurality of energy bands; and
processing circuitry configured to:
with the gamma camera at a predetermined position, acquire the pixel corresponding energy spectrum at each pixel of the plurality of pixels of the gamma camera;
select an emission spectrum, the emission spectrum having one or more energy bands;
select points of the mesh of the observation field;
based on the pixel corresponding energy spectrum acquired by each pixel of the plurality of pixels of the gamma camera, estimate a spatial distribution of an activity, corresponding to the selected emission spectrum for the selected points of the mesh;
for each energy band of the emission spectrum, determine a corresponding conversion function relating a photon flux value to a dose rate value for the energy band; and
based on the determined corresponding conversion function for each energy band of the emission spectrum and the estimated spatial distribution of the activity, estimate a dose rate generated, at the gamma camera, by the selected points.

* * * * *